United States Patent
Guo et al.

(10) Patent No.: US 12,288,997 B2
(45) Date of Patent: Apr. 29, 2025

(54) MULTI-LOAD WIRELESS POWER TRANSFER SYSTEM BASED ON HIGH-ORDER ANTI-PT SYMMETRY

(71) Applicant: Tongji University, Shanghai (CN)

(72) Inventors: Zhiwei Guo, Shanghai (CN); Yunhui Li, Shanghai (CN); Kejia Zhu, Shanghai (CN); Jun Jiang, Shanghai (CN); Yong Sun, Shanghai (CN); Haitao Jiang, Shanghai (CN); Hong Chen, Shanghai (CN)

(73) Assignee: Tongji University, Shanghai (CN)

( * ) Notice: Subject to any disclaimer, the term of this patent is extended or adjusted under 35 U.S.C. 154(b) by 2 days.

(21) Appl. No.: 18/502,177

(22) Filed: Nov. 6, 2023

(65) Prior Publication Data
US 2024/0162757 A1 May 16, 2024

(30) Foreign Application Priority Data
Nov. 8, 2022 (CN) .......................... 202211389897.2

(51) Int. Cl.
*H02J 50/12* (2016.01)
*H02J 50/00* (2016.01)

(52) U.S. Cl.
CPC ............ *H02J 50/12* (2016.02); *H02J 50/005* (2020.01)

(58) Field of Classification Search
CPC .............................. H02J 50/12; H02J 50/005
See application file for complete search history.

(56) References Cited

U.S. PATENT DOCUMENTS

| 9,747,391 B2* | 8/2017 | Suh .......................... G06F 30/00 |
| 2013/0304443 A1* | 11/2013 | Suh .......................... B60L 5/005 703/8 |
| 2019/0078938 A1* | 3/2019 | Favero .................. G01J 5/0803 |

* cited by examiner

*Primary Examiner* — Jared Fureman
*Assistant Examiner* — Michael J Warmflash
(74) *Attorney, Agent, or Firm* — Wang Law Firm, Inc.

(57) ABSTRACT

The present invention provides a multi-load wireless power transfer system based on high-order Anti-PT symmetry. By introducing a "W-shaped" anti-resonance mode into a basic WPT platform, an effective Anti-PT non-Hermitian system is conveniently constructed. The "level attraction" of the anti-resonance mode is combined with the "level splitting" of the anti-resonance mode and the resonance mode, to study the "level pinning" effect of high-order Anti-PT symmetry. Compared with the traditional resonant WPT, the anti-resonant WPT has higher security, stability, transfer efficiency, and flexibility. Considering the miniaturization and integration of devices, a "meta coil" is designed by using a "synthetic dimension", and used to construct a high-order Anti-PT symmetric system, thereby achieving multi-load efficient WPT. The new WPT technology based on the "level pinning" effect of high-order Anti-PT symmetry provides a good application research platform for enriching non-Hermitian physics.

7 Claims, 4 Drawing Sheets

MULTI-LOAD WIRELESS POWER TRANSFER SYSTEM BASED ON HIGH-ORDER ANTI-PT SYMMETRY

TECHNICAL FIELD

The present invention relates to the technical field of wireless power transfer, and in particular, to a multi-load wireless power transfer system that achieves high efficiency and stability based on the "level pinning" effect of an anti-resonance state in a high-order Anti-Parity-Time (Anti-PT) symmetric system.

BACKGROUND

Wireless Power Transfer (WPT) is a technology that uses electromagnetic waves to directly transfer electric energy from power supply to load. It opens up a new way for people to use electric energy, and it has important application value for scenarios requiring power supply of high degree of freedom, such as consumer electronics industry, automation industrial workshop, and artificial intelligence platform. However, the traditional WPT is severely limited by the transfer distance. Researchers have found that magnetic resonant WPT can achieve high-efficiency energy transfer in medium distance through the near-field coupling effect between two resonance coils (in which the coupling strength decays exponentially with the increase of coil distance), thereby promoting the wide development of the non-radiative magnetic resonant WPT. Nevertheless, the most obvious disadvantage of the magnetic resonant WPT is that it is difficult to achieve high efficiency and strong stability of energy transfer at the same time. On one hand, for strong coupling (small distance between resonance coils), high transfer efficiency can be guaranteed, but the operating frequency will be split due to near-field coupling. Therefore, when the distance between the transmitter resonance coil and the receiver resonance coil changes, the optimal operating frequency of the system will shift, thereby reducing the stability of the device. On the other hand, for weak coupling (large distance between resonance coils), the stable operating frequency can be guaranteed, but the transfer efficiency will be significantly reduced. Therefore, how to achieve stable energy transfer while maintaining high transfer efficiency has become a contradiction difficult to reconcile in medium- and long-range WPT. In order to resolve this problem, researchers propose to use a frequency tracking circuit to constantly change the operating frequency of the system, and after the most efficient frequency is scanned, the optimal operating frequency is switched to ensure efficient WPT. Although this solution can achieve higher transfer efficiency, the frequency scanning tracking circuit of the system not only increases the complexity of equipment construction, but also puts forward higher requirements for the performance of circuit components. As a result, the complex circuit matching network still has limitations in many application scenarios.

In recent years, the remarkable development of non-Hermitian physics provides a new principle support for the innovation of modern WPT technology. Researchers apply Parity-Time (PT) symmetry in non-Hermitian physics to the WPT system, and achieve robust WPT of adaptive tracking of the optimal operating frequency of the system through nonlinear circuits. Although this solution is limited by the core component operational amplifier, and the maximum power of the system is difficult to reach more than 10 W, it inspires people to explore new research perspectives from new physical principles, thereby promoting the emergence of new technologies and devices. At present, the WPT technology based on the frequency tracking circuit and nonlinear effect has gradually resolved the problem of locking the optimal operating frequency of WPT. However, it still has strong sensitivity to complex circuits and nonlinear components in devices. As a result, the overall stability of the system is still poor. In addition, how to achieve stable and efficient WPT with long distance, high transmitter/receiver area ratio, and multiple loads is still an important scientific problem to be resolved urgently.

SUMMARY

In view of the above scientific problem, the present invention provides a "W-shaped" anti-resonance structure for the first time. By introducing the anti-resonance mode into the basic WPT platform, an effective Anti-Parity-Time (Anti-PT) non-Hermitian system can be conveniently constructed. The "level attraction" of the anti-resonance mode is combined with the "level splitting" of the anti-resonance mode and the resonance mode, to study the "level pinning" effect of high-order Anti-PT symmetry.

The technical solutions adopted by the present invention are as follows:

A multi-load wireless power transfer system based on high-order Anti-PT symmetry is provided: a third-order Anti-PT symmetric WPT system is constructed by coupling a W-shaped anti-resonance structure with a Lorentz resonance structure; and for the W-shaped anti-resonance structure, a coupling coefficient between two detuning modes $\omega_+=\omega_0+\Delta$ and $\omega_-=\omega_0-\Delta$ is $i\gamma$, where $\Delta$ represents a detuning factor, and a coupling coefficient between the resonance modes in the W-shaped anti-resonance structure and the resonance structure is $\kappa$.

The motion equation of the system is:

$$\frac{da_+}{dt} = [-i(\omega_0 + \Delta) - \gamma_+ - \Gamma_+]a_+ + \gamma a_- + ik_+ a_0 + \sqrt{2\gamma_+}\, S_{+,T_1}$$

$$\frac{da_-}{dt} = [-i(\omega_0 - \Delta) - \gamma_- - \Gamma_-]a_- + \gamma a_+ - ik_- a_0 + \sqrt{2\gamma_-}\, S_{-,T_1}$$

$$\frac{da_0}{dt} = [-i\omega_0 - \gamma_0 - \Gamma_0]a_0 + ik_+ a_+ - ik_- a_-$$

where $\gamma_j$ and $\Gamma_j$ (j=+, −, 0) respectively represent a radiation loss and an intrinsic loss of the resonance mode $a_j = A_j e^{-i\omega t}$; $\kappa_\pm$ represents a near-field coupling strength between the anti-resonance structure and the resonance structure; $S_{+,T_1}$ and $S_{-,T_1}$ represent an electromagnetic wave inputted from the outside to the anti-resonance structure; and in a case that $\gamma_+=\gamma_-=\gamma_0/2=\gamma$ and $\kappa_+=\kappa_-=\kappa$ are considered, the intrinsic loss $\Gamma_+=\Gamma_-=\Gamma_0=0$ of the system is ignored, and the non-reflective condition $S_{k,R_1}=-S_{K,T_1}+\sqrt{2\gamma_k}a_k=0$ (k=+,−) is considered, the dynamic equation of the system can be represented as:

$$H\begin{pmatrix}a_+\\a_0\\a_-\end{pmatrix}=\omega\begin{pmatrix}a_+\\a_0\\a_-\end{pmatrix} \qquad \text{Formula (2)}$$

In this case, the equivalent Hamiltonian of the system is represented as:

$$H = \begin{pmatrix} \omega_0 + \Delta + i\gamma & -\kappa & i\gamma \\ -\kappa & \omega_0 - 2i\gamma & \kappa \\ i\gamma & \kappa & \omega_0 - \Delta + i\gamma \end{pmatrix} \quad \text{Formula (3)}$$

where $\omega_0$ represents the center frequencies of resonance and anti-resonance systems, $\Delta$ represents a frequency detuning factor of the anti-resonance structure, $\Gamma$ represents a coupling strength between the anti-resonance structure and the resonance structure, $\gamma$ represents a radiation loss of two detuning modes in the anti-resonance structure; and it is determined from Formula (3) that a non-Hermitian system satisfies the third-order Anti-PT symmetry condition $(PT)H(PT)^{-1}=PH*P=-H$ and the center of symmetry of the system is $\gamma_0$ of a frequency space.

Further, in order not to lose generality, first, assuming that $\gamma=1$, in this case, under different coupling strengths $\kappa$, the position where the system modes merge corresponds to an exceptional point of the non-Hermitian system.

Further, according to formula (1), the transfer efficiency of the WPT system with the W-shaped anti-resonance structure and the Lorentz resonance structure in third-order Anti-PT symmetry is represented as:

$$\eta = \left|\frac{S_{2+}}{S_{+,T_1}+S_{-,T_1}}\right|^2 = \left|\frac{2\sqrt{\gamma}A_0}{\sqrt{2\gamma}(A_+ + A_-)}\right|^2 \quad \text{Formula (4)}$$

where $S_{2+}$ represents a signal outputted from the resonance structure, $S_{+,T_1}$ and $S_{-,T_1}$ represent signals inputted from the anti-resonance structure, $A_0$ represents an amplitude of the resonance structure, and $A_+$ and $A_-$ represent amplitudes of the detuning mode of the anti-resonance structure; and at a fixed operating frequency $\omega=\omega_0$, the transfer efficiency of the system is constantly $\eta=4\gamma/4\gamma=1$.

Further, an anti-resonance transmitter coil (ATC) is designed by using a planar meta coil, and then a receiver coil (RC) is matched to build a compact third-order Anti-PT symmetric WPT system.

Further, radii of the ATC and the RC are represented by using R and r respectively; when R=15 cm is fixed, a near-field coupling coefficient $\kappa_0=159.55e^{-0.72R/r}$ between the ATC and the RC decays exponentially with the increase of a transmitter/receiver area ratio.

Further, a bypass capacitor is used as an equivalent circuit diagram of the ATC of a synthetic dimension, and in a case that the AC supply voltage is $U=-I_1Z$, the Kirchhoff equation of the ATC can be represented as:

$(i\omega L_1 + 1/i\omega C_1 1/i\omega C_0 - Z)I_1 + I_2/i\omega C_0 = 0$ $I_1/i\omega C_0 + (i\omega L_2 + 1/i\omega C_2 + 1/i\omega C_0)I_2 = 0$ \quad Formula (5)

where $I_1$ and $I_2$ respectively represent currents in different directions; $-Z$ represents an impedance of the power supply; and due to the symmetry of the ATC structure, $L_1=L_2=L$ and $C_2=C_1$.

It is assumed that $1/C=1/C_1+1/C_0$, $\omega_0=1/\sqrt{LC}$, and a proper approximation $\omega^2-\omega\omega_0^2 \approx \omega(\omega-\omega_0)$ is made; and the amplitude of the ATC structure mode is represented as $a_n=(-iL_n/\omega)dI_n|dt(n=1,2)$, and then Formula (5) is rewritten as $(\omega_0-\omega-Zi/2L)a_1+(1/2\omega C_0 L)a_2=0$ $(1/2\omega C_0 L)a_1+(\omega_0-\omega)a_2=0$ \quad Formula (6)

to obtain that the equivalent gain and effective coupling of the ATC structure are $\gamma_0=-Z/2L$ and $\kappa=1/2\omega C_0 L$ respectively.

Further, a synthetic third-order Anti-PT symmetric W PT system is further proposed, and assuming that $L_3=L$, $C_3=C$, and $R=Z$, in this case, the Kirchhoff equation of the system is represented as:

$(i\omega L+1/i\omega C_1+1/i\omega C_0-Z)I_1+I_2/i\omega C_0=0$ $I_1/i\omega C_0+(i\omega L+1/i\omega C_1+1/i\omega C_0)I_2+i\omega MI_3=0$ $i\omega MI_2+(i\omega L+1/i\omega C+Z)I_3=0$ \quad Formula (7)

where $M=\xi L$ represents a mutual inductance of the synthesized ATC and TC; $\xi=-C/C_0$ represents a coupling factor of different loads; and similar to Formula (6), the dynamic equation of the ATC and RC coupling system is represented as $$\frac{da_1}{dt} = (-i\omega_0 - Z/2L)a_1 - i(1/2\omega C_0 L)a_2 \quad \text{Formula (8)}$$

$$\frac{da_2}{dt} = -i\omega_0 a_2 - i(1/2\omega C_0 L)a_1 + i(M\omega/2L)a_3$$

$$\frac{da_3}{dt} = (-i\omega_0 + Z/2L)a_3 + i(M\omega/2L)a_2$$

By using a unitary transformation $a_1=(a_++a_-)/\sqrt{2}$, $a_2=(a_+-a_-)/\sqrt{2}$, and $a_3=a_0$, the motion equation of the system can be represented as $$\frac{da_+}{dt} = -i\left(\omega_0 + \frac{1}{2\omega C_0 L} - \frac{Z}{4L}i\right)a_+ - \frac{Z}{4L}a_- + \frac{iM\omega_0}{2\sqrt{2}L}a_0 \quad \text{Formula (9)}$$

$$\frac{da_0}{dt} = -i\left(\omega_0 + \frac{Z}{2L}i\right)a_0 + \frac{iM\omega_0}{2\sqrt{2}L}(a_+ - a_-)$$

$$\frac{da_-}{dt} = -i\left(\omega_0 - \frac{1}{2\omega C_0 L} - \frac{Z}{4L}i\right)a_- - \frac{Z}{4L}a_+ - \frac{iM\omega_0}{2\sqrt{2}L}a_0$$

Assuming that $\Delta=1/2\omega C_0 L$ and $\gamma_0=-Z/2L$, the dynamic equation derived from the Kirchhoff equation is represented as:

$$\begin{pmatrix} \omega_0+\Delta+\frac{\gamma_0}{2}i & -\frac{\Delta}{\sqrt{2}} & \frac{\gamma_0}{2}i \\ -\frac{\Delta}{\sqrt{2}} & \omega_0-i\gamma_0 & \frac{\Delta}{\sqrt{2}} \\ \frac{\gamma_0}{2}i & \frac{\Delta}{\sqrt{2}} & \omega_0-\Delta+\frac{\gamma_0}{2}i \end{pmatrix}\begin{pmatrix} a_+ \\ a_0 \\ a_- \end{pmatrix} = \omega\begin{pmatrix} a_+ \\ a_0 \\ a_- \end{pmatrix} \quad \text{Formula (10)}$$

In a case that it is defined that $\gamma=\gamma_0/2$ and $\kappa=-\Delta/2$, the equivalent Hamiltonian of the system is represented as Formula (3), and the system satisfies the Anti-PT symmetry condition $(PT)H(PT)^{-1}=PH*P=-H$.

The beneficial effects of the technical solutions of the present invention are as follows:

Compared with the traditional resonant WPT, the anti-resonant WPT has higher security (that is, lower idle power loss), stability, transfer efficiency, and flexibility. Considering the miniaturization and integration of devices, in the present invention, a "meta coil" is designed by using the "synthetic dimension", and used to construct a high-order Anti-PT symmetric system, thereby achieving multi-load high-efficiency WPT. The new WPT technology based on the "level pinning" effect of high-order Anti-PT symmetry not only provides a good application research platform for enriching non-Hermitian physics, but also opens up a new way to break through the traditional resonance mechanism in near-field applications, such as resonance imaging, wireless sensing, and photonic routing.

BRIEF DESCRIPTION OF THE DRAWINGS

Other features, objects, and advantages of this application will become more apparent by reading the detailed description of non-restrictive embodiments with reference to the accompanying drawings below.

DETAILED DESCRIPTION

Figure 1:
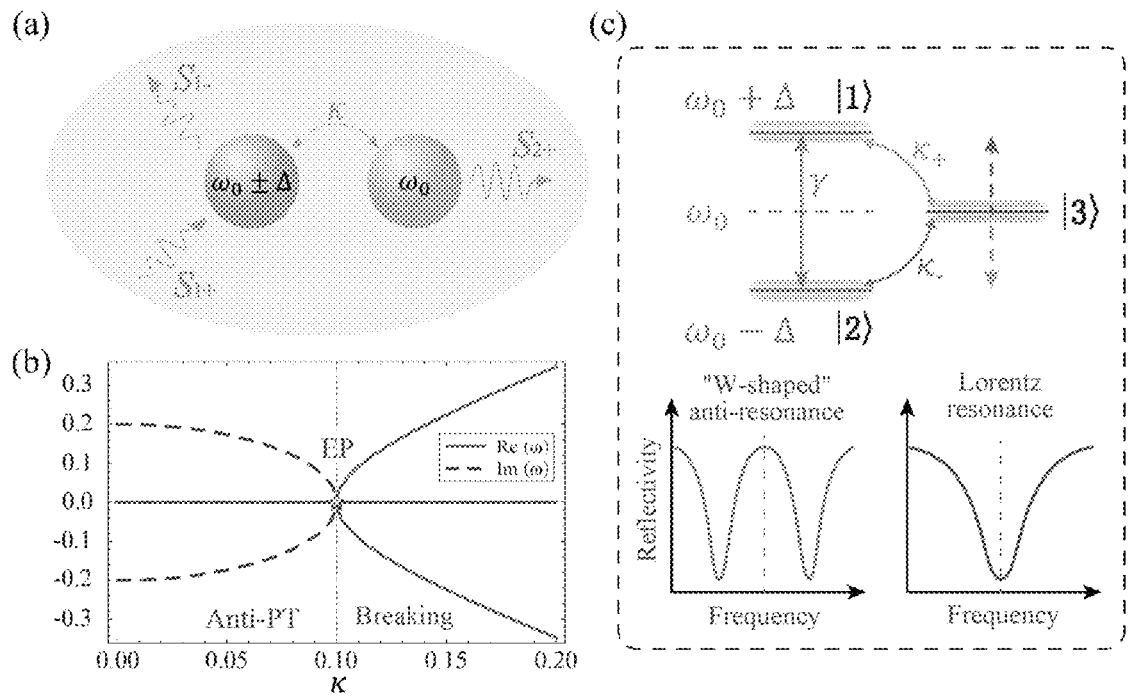
FIG. 1 shows an efficient third-order Anti-PT symmetric non-Hermitian system, where (a) is an energy transfer model with coupled "W-shaped" anti-resonance structure and Lorentz resonance structure; (b) is the real part (solid line) and the imaginary part (dotted line) of the intrinsic frequency of the system under different coupling strengths $\kappa$; and (c) is an equivalent three-level model of the effective third-order Anti-PT symmetric non-Hermitian system.
Figure 2:
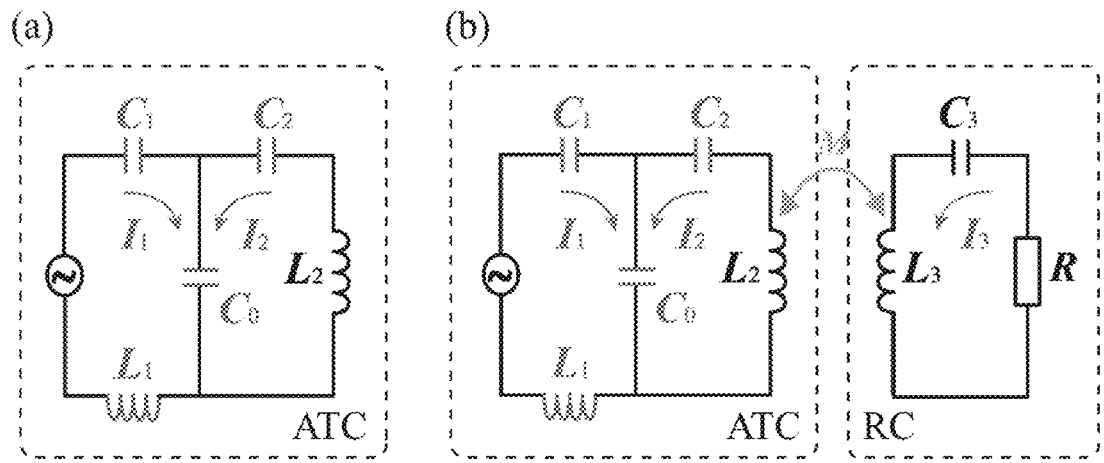
FIG. 2 shows an equivalent circuit model of the effective third-order Anti-PT symmetric non-Hermitian system, where (a) is a circuit model of a separate ATC; and (b) is a circuit model with coupled ATC and RC.

This application is described in further detail below with reference to the accompanying drawings and embodiments. It may be understood that the specific embodiments described herein are intended only to explain the relevant invention instead of limiting the invention. In addition, it should also be noted that only parts related to the invention are shown in the drawings for convenience of description.

It should be noted that the embodiments in this application and the features in the embodiments can be combined with each other without conflict. This application will be described in detail below with reference to the accompanying drawings and embodiments.

1. The Principle of the Solution is Introduced

According to the present invention, a third-order Anti-PT symmetric WPT system is constructed by coupling a "W-shaped" anti-resonance structure with a Lorentz resonance structure, and a corresponding physical model thereof is shown in FIG. 1(a). For the "W-shaped" anti-resonance structure, a coupling coefficient between two detuning modes $\omega_+ = \omega_0 + \Delta$ and $\omega_- = \omega_0 - \Delta$ is $i\gamma$, where $\Delta$ represents a detuning factor. In addition, a coupling coefficient between the resonance modes $\omega_0$ in the "W-shaped" anti-resonance structure and the resonance structure is $\kappa$. The motion equation of the system shown in FIG. 1(a) can be written as:

$$\frac{da_+}{dt} = [-i(\omega_0 + \Delta) - \gamma_+ - \Gamma_+]a_+ + \gamma a_- + ik_+ a_0 + \sqrt{2\gamma_+}\, S_{+,T_1} \quad \text{Formula (1)}$$

$$\frac{da_-}{dt} = [-i(\omega_0 - \Delta) - \gamma_- - \Gamma_-]a_- + \gamma a_+ - ik_- a_0 + \sqrt{2\gamma_-}\, S_{-,T_1}$$

$$\frac{da_0}{dt} = [-i\omega_0 - \gamma_0 - \Gamma_0]a_0 + ik_+ a_+ - ik_- a_-$$

where $\gamma_j$ and $\Gamma_j$ (j=+, −, 0) respectively represent a radiation loss and an intrinsic loss of the resonance mode $a_j = A_j e^{-i\omega t}$; $\kappa_\pm$ represents a near-field coupling strength between the anti-resonance structure and the resonance structure; $S_{+,T_1}$ and $S_{-,T_1}$ represent an electromagnetic wave inputted from the outside to the anti-resonance structure. In a case that $\gamma_+ = \gamma_- = \gamma_0/2 = \gamma$ and $\kappa_+ = \kappa_- = \kappa$ are considered, the intrinsic loss $\Gamma_+ = \Gamma_- = \Gamma_0 = 0$ of the system is ignored, and the non-reflective condition $S_{k,R_1} = -S_{k,T_1} + \sqrt{2\gamma_k}\, a_k = 0$ (k=+,−) is considered, the dynamic equation of the system can be represented as:

$$H\begin{pmatrix} a_+ \\ a_0 \\ a_- \end{pmatrix} = \omega \begin{pmatrix} a_+ \\ a_0 \\ a_- \end{pmatrix} \quad \text{Formula (2)}$$

In this case, the equivalent Hamiltonian of the system can be represented as:

$$H = \begin{pmatrix} \omega_0 + \Delta + i\gamma & -\kappa & i\gamma \\ -\kappa & \omega_0 - 2i\gamma & \kappa \\ i\gamma & \kappa & \omega_0 - \Delta + i\gamma \end{pmatrix} \quad \text{Formula (3)}$$

where $\omega_0$ represents the center frequencies of resonance and anti-resonance systems, $\Delta$ represents a frequency detuning factor of the anti-resonance structure, $\kappa$ represents a coupling strength between the anti-resonance structure and the resonance structure, and $\gamma$ represents a radiation loss of two detuning modes in the anti-resonance structure. It can be determined from Formula (3) that a non-Hermitian system shown in FIG. 1 satisfies the third-order Anti-PT symmetry condition $(PT)H(PT)^{-1} = PH^*P = -H$ and the center of symmetry of the system is $\omega_0$ of a frequency space. In order not to lose generality, first, assuming that $\gamma=1$, in this case, under different coupling strengths $\kappa$, a real part and an imaginary part of the intrinsic frequency of the system are shown by the solid line and the dotted line in FIG. 1(b) respectively. The position where the system modes merge corresponds to an exceptional point (EP) of the non-Hermitian system, which is marked with the five-pointed star in the figure. It can be clearly seen that it always keeps pure real numbers at the center frequency $\omega_0$. The "level pinning" effect originates from the "level attraction" of the anti-resonance structure and the result of the upward and downward "level repulsion" interaction of $\omega_+ = \omega_0 + \Delta$ and $\omega_- = \omega_0 - \Delta$ in the anti-resonance structure respectively for $\omega_0$ in the resonance structure. The corresponding three levels of the system are shown in FIG. 1(c).

According to Formula (1), the transfer efficiency of the WPT system with the W-shaped anti-resonance structure and the Lorentz resonance structure in third-order Anti-PT symmetry can be represented as:

$$\eta = \left|\frac{S_{2+}}{S_{+,T_1} + S_{-,T_1}}\right|^2 = \left|\frac{2\sqrt{\gamma} A_0}{\sqrt{2\gamma}(A_+ + A_-)}\right|^2 \quad \text{Formula (4)}$$

where $S_{2+}$ represents a signal outputted from the resonance structure, $S_{+,T_1}$ and $S_{-,T_1}$ represent signals inputted from the anti-resonance structure, $A_0$ represents an amplitude of the resonance structure, and $A_+$ and $A_-$ represent amplitudes of the detuning mode of the anti-resonance structure. At a fixed operating frequency $\omega=\omega_0$, the transfer efficiency of the system is constantly $\eta=4\gamma/4\gamma=1$, which is unrelated to the coupling strength $\kappa$. Therefore, the third-order Anti-PT symmetric WPT technology provides a good solution to break through the problem that traditional resonant WPT is incompatible with the transfer efficiency and stability.

2. The Experimental Steps and Results

Figure 3:
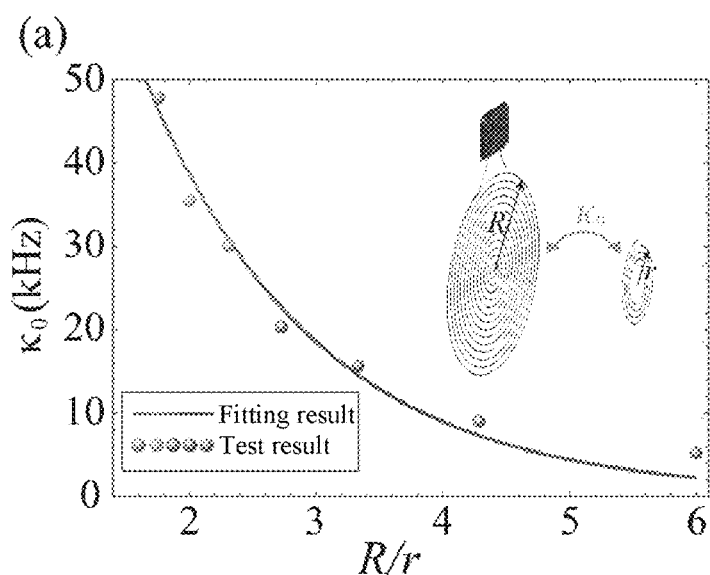
FIG. 3 shows the variation of coupling strength between the ATC and the RC with the transmitter/receiver area ratio in the third-order Anti-PT symmetric WPT system with "meta coil" structure.

In the experiment, the present invention proposes to design an anti-resonance transmitter coil (ATC) by using a planar "meta coil", and then match a receiver coil (RC) to build a compact third-order Anti-PT symmetric WPT system, as shown in the illustration in FIG. 3. The radii of the ATC and the RC are represented by R and r respectively. In a case that R=15 cm is fixed, FIG. 3 shows that a near-field coupling coefficient $\kappa_0=159.55e^{-0.72R/r}$ between the ATC and the RC decays exponentially with the increase of transmitter/receiver area ratio. The lumped circuit element part of the "meta coil" is shown in FIG. 3, where the power supply signal is inputted to the system from the "+" and "−" at the left end of the circuit board. $L_2$ marked on the circuit board represents that the litz line provides distributed inductance, while $L_1$ and $C_i$ (i=0,1,2) represent the lumped inductance and capacitance respectively.

The equivalent circuit diagram of the ATC using the bypass capacitance as a "synthetic dimension" is shown in FIG. 3. In a case that the AC supply voltage is $U=-I_1Z$, the Kirchhoff equation of the ATC can be represented as:

$$(i\omega L_1 + 1/i\omega C_1 - Z)I_1 + I_2/i\omega C_0 = 0$$

$$I_1/i\omega C_0 + (i\omega L_2 + 1/i\omega C_2 + 1/i\omega C_0)I_2 = 0 \quad \text{Formula (5)}$$

where $I_1$ and $I_2$ represent currents in different directions respectively; and $-Z$ represents an impedance of the power supply. Considering the symmetry of the ATC structure, $L_1=L_2=L$ and $C_2=C_1$ are considered. In addition, in order to simplify the system, it is assumed that $1/C=1/C_1+1/C_0$ and $\omega_0=1/\sqrt{LC}$, and a proper approximation $\omega^2-\omega_0^2 \approx 2\omega(\omega-\omega_+)$ is made. The amplitude of the ATC structure mode can be represented as $a_n=(-iL_n/\omega)dI_n/dt$ (n=1,2), and then Formula (5) can be rewritten as $$(\omega_0-\omega-Zi/2L)a_1 + (\tfrac{1}{2}\omega C_0 L)a_2 = 0$$

$$(\tfrac{1}{2}\omega C_0 L)a_1 + (\omega_0-\omega)a_2 = 0 \quad \text{Formula (6)}$$

Further, in order to connect the Kirchhoff equation with the coupled-mode theory, it is obtained that the equivalent gain and effective coupling of the ATC structure are $\gamma_0=-Z/2L$ and $\kappa=\tfrac{1}{2}\omega C_0 L$ respectively.

Considering the ATC and RC coupling structure shown in FIG. 3, the present invention proposes a synthetic third-order Anti-PT symmetric WPT system. To simplify the system, it is assumed that $L_3=L$, $C_3=C$, and R=Z. In this case, the Kirchhoff equation of the system can be represented as:

$$(i\omega L + 1/i\omega C_1 + 1/i\omega C_0 - Z)I_1 + I_2/i\omega C_0 = 0$$

$$I_1/i\omega C_0 + (i\omega L + 1/i\omega C_1 + 1/i\omega C_0)I_2 + i\omega M I_3 = 0$$

$$i\omega M I_2 + (i\omega L + 1/i\omega C + Z)I_3 = 0 \quad \text{Formula (7)}$$

where $M=\xi L$ represents a mutual inductance of the synthesized ATC and TC; and $\xi=-C/C_0$ represents a coupling factor of different loads. Similar to Formula (6), the dynamic equation of the ATC and RC coupling system can be represented as $$\frac{da_1}{dt} = (-i\omega_0 - Z/2L)a_1 - i(1/2\omega C_0 L)a_2 \quad \text{Formula (8)}$$

$$\frac{da_2}{dt} = -i\omega_0 a_2 - i(1/2\omega C_0 L)a_1 + i(M\omega/2L)a_3$$

$$\frac{da_3}{dt} = (-i\omega_0 + Z/2L)a_3 + i(M\omega/2L)a_2$$

By using a suitable unitary transformation $a_1=(a_++a_-)/\sqrt{2}$, $a_2=(a_+-a_-)/\sqrt{2}$, and $a_3=a_0$, the motion equation of the system can be represented as $$\frac{da_+}{dt} = -i\left(\omega_0 + \frac{1}{2\omega C_0 L} - \frac{Z}{4L}i\right)a_+ - \frac{Z}{4L}a_- + \frac{iM\omega_0}{2\sqrt{2}L}a_0 \quad \text{Formula (9)}$$

$$\frac{da_0}{dt} = -i\left(\omega_0 + \frac{Z}{2L}i\right)a_0 + \frac{iM\omega_0}{2\sqrt{2}L}(a_+ - a_-)$$

$$\frac{da_-}{dt} = -i\left(\omega_0 - \frac{1}{2\omega C_0 L} - \frac{Z}{4L}i\right)a_- - \frac{Z}{4L}a_+ - \frac{iM\omega_0}{2\sqrt{2}L}a_0$$

Assuming that $\Delta=\tfrac{1}{2}\omega C_0 L$ and $\gamma_0=-Z/2L$, the dynamic equation derived from the Kirchhoff equation can be represented as:

$$\begin{pmatrix} \omega_0 + \Delta + \frac{\gamma_0}{2}i & -\frac{\Delta}{\sqrt{2}} & \frac{\gamma_0}{2}i \\ -\frac{\Delta}{\sqrt{2}} & \omega_0 - i\gamma_0 & \frac{\Delta}{\sqrt{2}} \\ \frac{\gamma_0}{2}i & \frac{\Delta}{\sqrt{2}} & \omega_0 - \Delta + \frac{\gamma_0}{2}i \end{pmatrix} \begin{pmatrix} a_+ \\ a_0 \\ a_- \end{pmatrix} = \omega \begin{pmatrix} a_+ \\ a_0 \\ a_- \end{pmatrix} \quad \text{Formula (10)}$$

In a case that it is defined that $\gamma=\gamma_0/2$ and $\kappa=-\Delta/2$, the equivalent Hamiltonian of the system can be represented as Formula (3), that is, the system satisfies the Anti-PT symmetry condition $(PT)H(PT)^{-1}=PH^*P=-H$. Therefore, a WPT system that satisfies the third-order Anti-PT symmetry is constructed conveniently by introducing the synthetic ATC structure.

Figure 4:
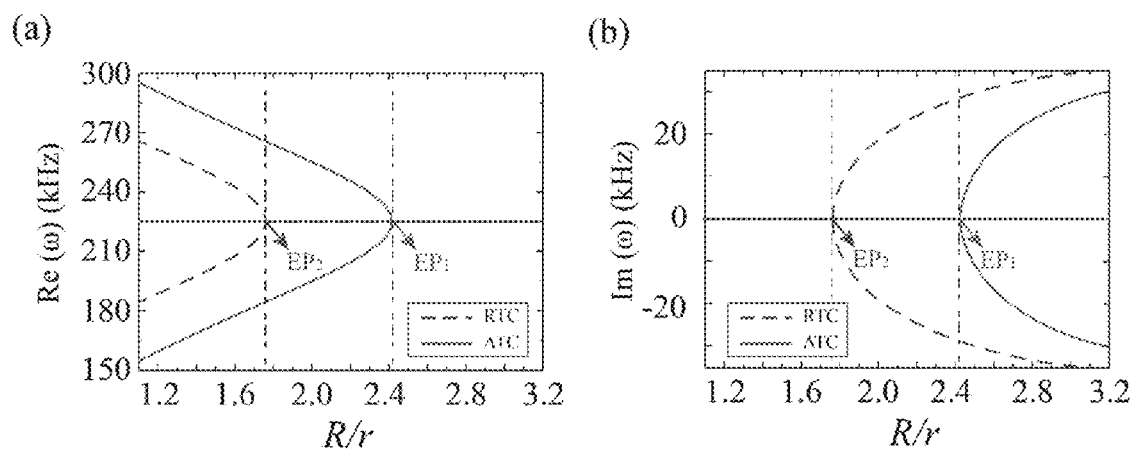
FIG. 4 shows the real part (a) and the imaginary part (b) of the intrinsic frequency of the system at different transmitter/receiver area ratios R/r, where the solid line and the dotted line respectively represent WPT systems corresponding to the ATC and the RTC.

It can be found from Formula (4) that the third-order Anti-PT symmetric non-Hermitian system can achieve energy transfer independent of coupling strength, that is, achieve efficient WPT with different transmitter/receiver area ratios. In a case that L=98 μH, C=5.1 nF, and Z=50 Ω are selected, the real part and the imaginary part of the eigenvalue of the system with the change of the radius of the RC are shown in FIG. 4 respectively. It can be clearly seen that the intrinsic frequency $\omega_0$=226 kHz of pure real numbers is independent of the radius of the RC, which provides an effective way to achieve efficient WPT with different transmitter/receiver area ratios. Especially, when the radius ratio of the ATC to the RC satisfies R/r=2.41, the eigenvalues merge at position EP1. For convenience of comparison, the ATC is replaced with a resonance transmitter coil (RTC) to give the phase diagram of traditional resonant WPT with the same parameters, as shown by the dotted line in FIG. 4. It can be found that for the traditional resonant WPT, when the radius ratio of the RTC to the RC satisfies R/r=1.7, the eigenvalues merge at position EP1. Once the radius ratio is greater than this critical value, the intrinsic frequency of the system is not a real number, which leads to a significant decrease in the transfer efficiency. In addition, it can be seen from FIG. 4 that the EP of the effective third-order Anti-PT symmetric WPT system appears at a larger radius ratio than that of the traditional resonant WPT.

Figure 5:
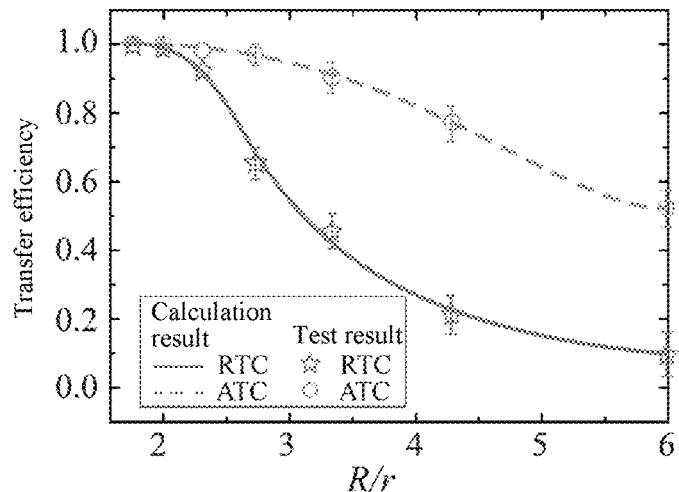
FIG. 5 shows the comparison of the transfer efficiency of the WPT systems corresponding to the ATC and the RTC.

Compared with the conventional resonant WPT system, the transfer efficiency of the synthesized anti-resonance system is shown in FIG. 5. The calculation and measurement results of the RTC (ATC) WPT system are represented by the solid line (dotted line) and the five-pointed stars (circles) respectively. It can be seen that, on one hand, for the resonant WPT systems, it is necessary to track the optimal operating frequency when considering different radius ratios. However, the Anti-PT symmetric WPT system with anti-resonance is always fixed at the operating frequency $\omega_0$=226 kHz. On the other hand, the transfer efficiency of the Anti-PT symmetric WPT is relatively stable, while in the resonant WPT system, when the radius ratio R/r is greater than 2.4, the transfer efficiency drops sharply. By comparing the transfer efficiency of FIG. 5, it can be found that this Anti-PT symmetric WPT system with real eigenfrequency independent of radius ratio can be regarded as an efficient WPT solution with high transmitter/receiver area ratio without frequency tracking.

Figure 6:
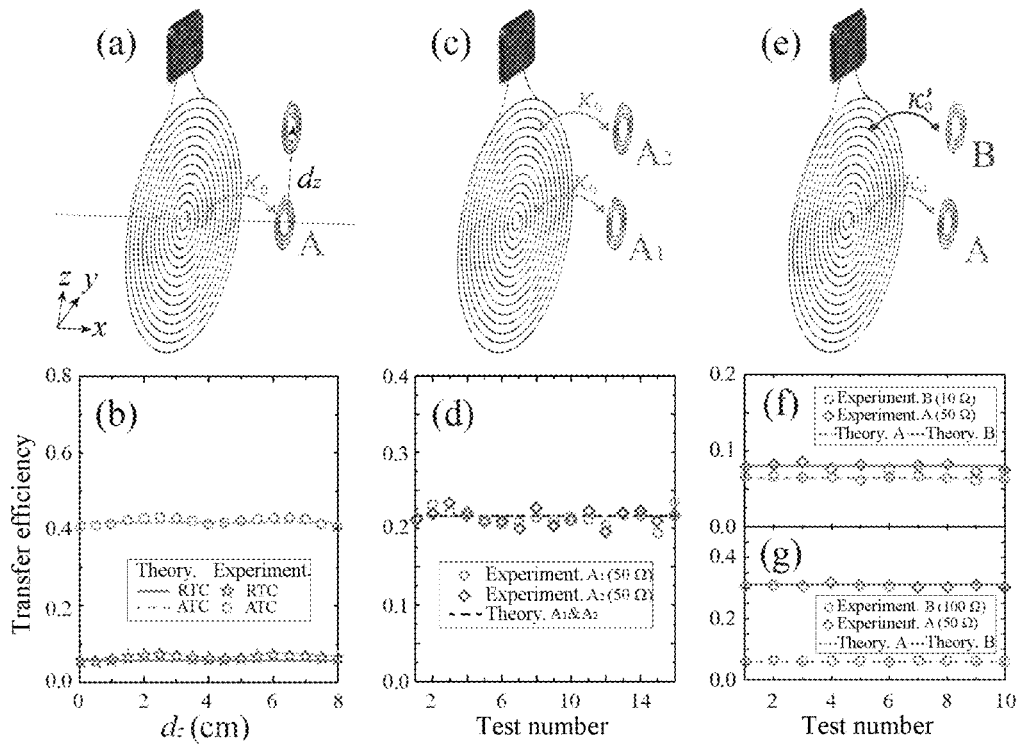
FIG. 6 shows the transfer efficiency of the system when the WPT system with the introduced ATC is used for multi-load energy transfer, where (a) and (b) are mobile loads A; (c) and (d) are the comparison of the transfer efficiency of two identical loads; and (e), (f), and (g) are the comparison of transfer efficiency of two different loads.

The present invention proposes diversified multi-load WPT by using the efficient WPT with high transmitter/receiver area ratio achieved by the Anti-PT symmetric WPT system. First, the magnetic field distribution in the spiral planar coil structure is uniform. FIG. 6(a) shows that the load A is moved in the z direction by different distances to test the coupling strength between the transmitter coil and the receiver coil. It is found that the coupling strength between the transmitter coil and the RC is always close to constant when the RC is moved, which leads to the transfer efficiency independent of the position of the RC. The dotted line and circles in FIG. 6(b) represent that when the corresponding radius ratio is R/r=6 (coupling strength is $\kappa_0$=5.1 kHz), the transfer efficiency obtained by theoretical calculation and experimental test when the RC is moved from 0 cm to 8 cm in the z direction in the third-order Anti-PT symmetric WPT system. As a control group, the transfer efficiency of the resonant WPT system under the same parameters calculated theoretically and experimentally is represented by the solid lines and the five-pointed stars. By comparing the third-order Anti-PT symmetric WPT system with the ATC and the resonant WPT system with the RTC, it can be found that the transfer efficiency of the third-order Anti-PT symmetric WPT system with high transmitter/receiver area ratio can be significantly improved.

Second, considering the case of containing n identical loads A (the coupling between loads is negligible), the Kirchhoff equation of the system can be written as $$(i\omega L + 1/\omega C_1 + 1/i\omega C_0 - Z)I_1 + I_2/i\omega C_0 = 0 \quad \text{Formula (11)}$$

$$I_1/i\omega C_0 + (i\omega L + 1/i\omega C_1 + 1/i\omega C_0)I_2 + \sum_{j=1}^{n} i\omega M_j I_{Aj} = 0$$

$$i\omega M_j I_2 + (i\omega L + 1/i\omega C + Z_{Aj})I_{Aj} = 0 \quad (j = 1, 2, \ldots, n)$$

where $I_{Aj}$ (j=1, 2, ..., n) represents the current of the $Aj^{th}$ load. Similar to Formula (8), the dynamic equation of the multi-load WPT system with the ATC can be represented as $$\frac{da_1}{dt} = (-i\omega_0 - Z/2L)a_1 - i(1/2\omega C_0 L)a_2 \quad \text{Formula (12)}$$

$$\frac{da_2}{dt} = -i\omega_0 a_2 - i(1/2\omega C_0 L)a_1 + \sum_{j=1}^{n} i(M_j \omega/2L)a_{Aj}$$

$$\frac{da_{Aj}}{dt} = (-i\omega_0 + Z_{Aj}/2L)a_{Aj} + i(M_j \omega/2L)a_2 (j = 1, 2, \ldots, n)$$

By using the two loads A1 and A2 ($Z_{A1}$=$Z_{A2}$=$Z_A$=50Ω and $\kappa_0$=5.1) shown in FIG. 6(c) as an example, the transfer efficiency of the load at the operating frequency $\omega$=$\omega_0$ is $$\eta_{A1}=(2\sqrt{\gamma_{A1}\gamma}\kappa_0\kappa_{A1}(-i\gamma_{A2})/X)^2$$

$$\eta_{A2}=(2\sqrt{\gamma_{A2}\gamma}\kappa_0\kappa_{A2}(-i\gamma_{A1})/X)^2 \quad \text{Formula (13)}$$

where X represents a constant factor of the multi-load WPT system, $\kappa_0$=½$\omega C_0 L$, $\gamma_0$=−Z/2L, $\gamma_{Aj}$=−$Z_{Aj}$/2L, and $\kappa_{Aj}$=−$M_j\omega$/2L (j=1,2). In the experiment, it is obtained through test that by randomly moving the transfer efficiencies of the loads A1 and A2 for 15 times, it can be found that the transfer efficiency is equally allocated, where $\eta_{A1}$=$\eta_{A2}$=0.21, as shown in FIG. 6(d). The result of theoretical calculation is represented by the dashed line, and the transfer efficiencies of the loads A1 and A2 obtained from experimental tests are represented by circles and prisms respectively.

Finally, the selective allocation problem of the transfer efficiency of the WPT system with ATC under the multi-load condition is further studied. Considering the two different loads $A_1$=A and $A_2$=B($Z_A \neq Z_B$) shown in FIG. 6(e), the transfer efficiency ratio of the two loads can be represented as $$\eta_A/\eta_B = \gamma_B \kappa_A^2 / \gamma_A \kappa_B^2 \quad \text{Formula (14)}$$

where $\omega_A$=−$Z_A$/2L ($\omega_B$=−$Z_B$/2L) and $\kappa_A$=$\kappa_0$($\kappa_B$=$\kappa_0$) represent the radiation loss and coupling strength of load A (B) respectively. Considering different loads B, including $Z_B$=10Ω($\kappa_0$=2.1 kHz) and $Z_B$=10Ω($\kappa_0$=3.2 kHz), the allocation problem of transfer efficiency is studied, as shown in FIG. 6(f) and FIG. 6(g). It can be seen that under different load conditions, the transfer efficiency ratios of the first case ($Z_A$=50Ω, $Z_B$=10Ω) to the second case ($Z_A$=50Ω, $Z_B$=100Ω) are close to 1.22 and 4.99 respectively. Therefore, the efficient WPT with high transmitter/receiver area ratio achieved by the Anti-PT symmetric WPT system can achieve flexible allocation of transfer efficiency among different loads.

Figure 7:
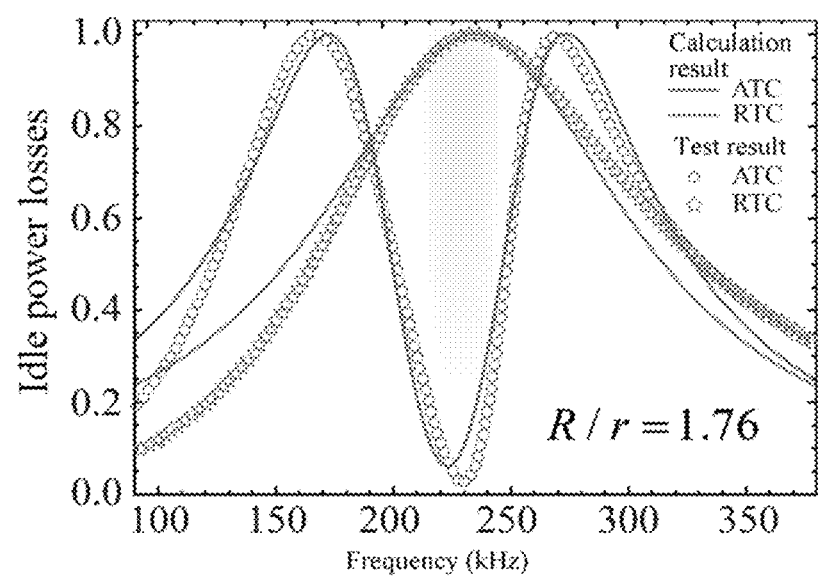
FIG. 7 shows the comparison of idle power losses of the WPT systems corresponding to the ATC and the RTC.

Focusing on security and energy saving, it is very meaningful to keep the low energy output of the system when the system is in idle state. In the traditional WPT solution, the idle power loss is always a difficult problem to resolve. However, for the Anti-PT symmetric system constructed by anti-resonance mode, this limitation can be well overcome. Compared with the conventional resonant WPT system, the idle power loss of the Anti-PT symmetric WPT system is shown in FIG. 7. The calculation and measurement results of the ATC and the RTC corresponding to the WPT system are represented by solid lines and symbols respectively. It can be clearly seen that the idle power loss of the Anti-PT symmetric WPT system near the operating frequency is obviously less than that of the traditional resonant WPT, which is beneficial to intermittent wireless charging and has better security in practical applications. The multi-load wireless power transfer system based on high-order Anti-PT symmetry provided by the present invention has the advantages as follows:

1. The high-order Anti-PT symmetric WPT system constructed by "W" type anti-resonance mode has real eigenvalues and high transfer efficiency.
2. The "level attraction" of anti-resonance mode is combined with the "level splitting" of anti-resonance mode and resonance mode, to study the "level pinning" effect of high-order Anti-PT symmetry, which can ensure the frequency locking of energy transfer, providing high stability.
3. The "meta coil" with anti-resonance mode is simply constructed, and its coil size is equivalent to that of the traditional resonance coil.
4. The transfer efficiency of the high-order Anti-PT symmetric WPT system is robust to the near-field coupling strength, which can achieve high transmitter/receiver area ratio and efficient energy transfer with multiple loads.

The above description is only a description of the preferred embodiment of this application and the technical principles employed. A person skilled in the art should understand that the invention scope in this application is not limited to technical solutions formed by specific combinations of the above technical features, and also should cover other technical solutions formed by any combination of the above technical features or their equivalent features without departing from the inventive concept, for example, the technical solution formed by replacing the above features with (but not limited to) the technical features with similar functions disclosed in this application.

What is claimed is:

1. A multi-load wireless power transfer system based on high-order Anti-PT symmetry, characterized in that, a third-order Anti-PT symmetric WPT system is constructed by coupling a W-shaped anti-resonance structure with a Lorentz resonance structure; and for the W-shaped anti-resonance structure, a coupling coefficient between two detuning modes $\omega_+=\omega_0+\Delta$ and $\omega_-=\omega_0-\Delta$ is $i\gamma$, wherein $\Delta$ represents a detuning factor, and a coupling coefficient between the resonance modes $\omega_0$ in the W-shaped anti-resonance structure and the resonance structure is $\kappa$; and a motion equation of the system is:

$$\frac{da_+}{dt} = [-i(\omega_0+\Delta)-\gamma_+-\Gamma_+]a_+ + \gamma a_- + ik_+a_0 + \sqrt{2\gamma_+}\, S_{+,T_1} \quad \text{Formula (1)}$$

$$\frac{da_-}{dt} = [-i(\omega_0-\Delta)-\gamma_--\Gamma_-]a_- + \gamma a_+ - ik_-a_0 + \sqrt{2\gamma_-}\, S_{-,T_1}$$

$$\frac{da_0}{dt} = [-i\omega_0 - \gamma_0 - \Gamma_0]a_0 + ik_+a_+ - ik_-a_-$$

wherein $\gamma_j$ and $\Gamma_j$ (j=+, −, 0) respectively represent a radiation loss and an intrinsic loss of the resonance mode $a_j = A_j e^{-i\omega \tau}$; $\kappa_\pm$ represents a near-field coupling strength between the anti-resonance structure and the resonance structure: $S_{+,T_1}$ and $S_{-,T_1}$ represent an electromagnetic wave inputted from the outside to the anti-resonance structure; and in a case that $\gamma_+=\gamma_-=\gamma_0/2=\gamma$ and $\kappa_+=\kappa_-=\kappa$ are considered, the intrinsic loss $\Gamma_+=\Gamma_-=\Gamma_0=0$ of the system is ignored, and a non-reflective condition $S_{k,R_1} = -S_{k,T_1}+\sqrt{2\omega_k}a_k=0$ (k=+,−) is considered, a dynamic equation of the system is represented as:

$$H\begin{pmatrix} a_+ \\ a_0 \\ a_- \end{pmatrix} = \omega \begin{pmatrix} a_+ \\ a_0 \\ a_- \end{pmatrix} \quad \text{Formula (2)}$$

in this case, an equivalent Hamiltonian of the system is represented as:

$$H = \begin{pmatrix} \omega_0+\Delta+i\gamma & -\kappa & i\gamma \\ -\kappa & \omega_0-2i\gamma & \kappa \\ i\gamma & \kappa & \omega_0-\Delta+i\gamma \end{pmatrix} \quad \text{Formula (3)}$$

wherein $\omega_0$ represents the center frequencies of resonance and anti-resonance systems, $\Delta$ represents a frequency detuning factor of the anti-resonance structure, $\kappa$ represents a coupling strength between the W-shaped anti-resonance structure and the Lorentz resonance structure, and $\gamma$ represents a radiation loss of two detuning modes in the anti-resonance structure; and it is determined from Formula (3) that a non-Hermitian system satisfies a third-order Anti-PT symmetry condition $(PT)H(PT)^{-1}=PH^*P=-H$ and the center of symmetry of the system is $\omega_0$ of a frequency space.

2. The multi-load wireless power transfer system based on high-order Anti-PT symmetry according to claim 1, characterized in that, in order not to lose generality, first, assuming that $\gamma=1$, in this case, under different coupling strengths $\kappa$, the position where the system modes merge corresponds to an exceptional point of the non-Hermitian system.

3. The multi-load wireless power transfer system based on high-order Anti-PT symmetry according to claim 1, characterized in that, according to Formula (1), the transfer efficiency of the WPT system with the W-shaped anti-resonance structure and the Lorentz resonance structure in third-order Anti-PT symmetry is represented as:

$$\eta = \left|\frac{S_{2+}}{S_{+,T_1}+S_{-,T_1}}\right|^2 = \left|\frac{2\sqrt{\gamma}\,A_0}{\sqrt{2\gamma}(A_++A_-)}\right|^2 \quad \text{Formula (4)}$$

wherein $S_{2+}$ represents a signal outputted from the resonance structure, $S_{+,T_1}$ and $S_{-,T_1}$ represent signals inputted from the anti-resonance structure, $A_0$ represents an amplitude of the resonance structure, and $A_+$ and $A_-$ represent amplitudes of the detuning mode of the anti-resonance structure; and at a fixed operating frequency $\omega=\omega_0$, the transfer efficiency of the system is constantly $\eta=4\gamma/4\gamma=1$.

4. The multi-load wireless power transfer system based on high-order Anti-PT symmetry according to claim 1, characterized in that, an anti-resonance transmitter coil (ATC) is designed by using a planar meta coil, and then a receiver coil (RC) is matched to build a compact third-order Anti-PT symmetric WPT system.

5. The multi-load wireless power transfer system based on high-order Anti-PT symmetry according to claim 4, characterized in that, radii of the ATC and the RC are represented by using R and r respectively: when R=15 cm is fixed, a near-field coupling coefficient $\kappa_0=159.55e^{-0.72R/r}$ between the ATC and the RC decays exponentially with the increase of a transmitter/receiver area ratio.

6. The multi-load wireless power transfer system based on high-order Anti-PT symmetry according to claim 5, characterized in that, a bypass capacitor is used as an equivalent circuit diagram of the ATC of a synthetic dimension, and in a case that the AC supply voltage is $U=-I_1Z$, the Kirchhoff equation of the ATC is represented as:

$$(i\omega L_1+1/i\omega C_1+1/i\omega C_0-Z)I_1+I_2/i\omega C_0=0$$

$$I_1/i\omega C_0+(i\omega L_2+1/i\omega C_2+1/i\omega C_0)I_2=0 \quad \text{Formula (5)}$$

wherein $I_1$ and $I_2$ respectively represent currents in different directions; $-Z$ represents an impedance of the power supply; and due to the symmetry of the ATC structure, $L_1=L_2=L$ and $C_2=C_1$; and it is assumed that $1/C=1/C_1+1/C_0$, $\omega_0=1/\sqrt{LC}$, and a proper approximation $\omega^2-\omega_0^2\approx 2\omega(\omega-\omega_0)$ is made; and the amplitude of the ATC structure mode is represented as $a_n=(-iL_n/\omega)dI_n/dt$ (n=1,2), and then Formula (5) is rewritten as $$(\omega_0-\omega-Zi/2L)a_1+(\tfrac{1}{2}\omega C_0 L)a_2=0$$

$$(\tfrac{1}{2}\omega C_0 L)a_2=0 \quad \text{Formula (6)}$$

to obtain that the equivalent gain and effective coupling of the ATC structure are $\gamma_0=-Z/2L$ and $\kappa=\tfrac{1}{2}\omega C_0 L$ respectively.

7. The multi-load wireless power transfer system based on high-order Anti-PT symmetry according to claim 6, characterized in that, a synthetic third-order Anti-PT symmetric W PT system is further proposed, and assuming that $L_3=L$, $C_3=C$, and $R=Z$, in this case, the Kirchhoff equation of the system is represented as:

$$(i\omega L+1/i\omega C_1+1/i\omega C_0-Z)I_1+I_2/i\omega C_0=0$$

$$I_1/i\omega C_0+(i\omega L+1/i\omega C_1+1/i\omega C_0)I_2+i\omega MI_3=0$$

$$i\omega MI_2+(i\omega L+1/i\omega C+Z)I_3=0 \quad \text{Formula (7)}$$

wherein $M=\xi L$ represents a mutual inductance of the synthesized ATC and TC; $\xi=-C/C_0$ represents a coupling factor of different loads; and similar to Formula (6), the dynamic equation of the ATC and RC coupling system is represented as:

$$\frac{da_1}{dt}=(-i\omega_0-Z/2L)a_1-i(1/2\omega C_0 L)a_2 \quad \text{Formula (8)}$$

$$\frac{da_2}{dt}=-i\omega_0 a_2-i(1/2\omega C_0 L)a_1+i(M\omega/2L)a_3$$

$$\frac{da_3}{dt}=(-i\omega_0+Z/2L)a_3+i(M\omega/2L)a_2$$

by using a unitary transformation $a_1=(a_++a_-)/\sqrt{2}$, $a_2=(a_+-a_-)/\sqrt{2}$, and $a_3=a_0$, the motion equation of the system is represented as $$\frac{da_+}{dt}=-i\left(\omega_0+\frac{1}{2\omega C_0 L}-\frac{Z}{4L}i\right)a_+-\frac{Z}{4L}a_-+\frac{iM\omega_0}{2\sqrt{2}L}a_0 \quad \text{Formula (9)}$$

$$\frac{da_0}{dt}=-i\left(\omega_0+\frac{Z}{2L}i\right)a_0+\frac{iM\omega_0}{2\sqrt{2}L}(a_+-a_-) \quad ; \text{ and}$$

$$\frac{da_-}{dt}=-i\left(\omega_0-\frac{1}{2\omega C_0 L}-\frac{Z}{4L}i\right)a_--\frac{Z}{4L}a_+-\frac{iM\omega_0}{2\sqrt{2}L}a_0$$

assuming that $\Delta=\tfrac{1}{2}\omega C_0 L$ and $\gamma_0=-Z/2L$, the dynamic equation derived from the Kirchhoff equation is represented as:

$$\begin{pmatrix} \omega_0+\Delta+\frac{\gamma_0}{2}i & -\frac{\Delta}{\sqrt{2}} & \frac{\gamma_0}{2}i \\ -\frac{\Delta}{\sqrt{2}} & \omega_0-i\gamma_0 & \frac{\Delta}{\sqrt{2}} \\ \frac{\gamma_0}{2}i & \frac{\Delta}{\sqrt{2}} & \omega_0-\Delta+\frac{\gamma_0}{2}i \end{pmatrix}\begin{pmatrix}a_+\\a_0\\a_-\end{pmatrix}=\omega\begin{pmatrix}a_+\\a_0\\a_-\end{pmatrix} \quad \text{Formula (10)}$$

in a case that it is defined that $\gamma=\gamma_0/2$ and $\kappa=-\Delta/2$, the equivalent Hamiltonian of the system is represented as Formula (3), and the system satisfies the Anti-PT symmetry condition $(PT)H(PT)^{-1}=PH^*P=-H$.

* * * * *